(No Model.)
J. R. FRANCE.
PROCESS OF PURIFYING CAMPHOR.
No. 574,725. Patented Jan. 5, 1897.
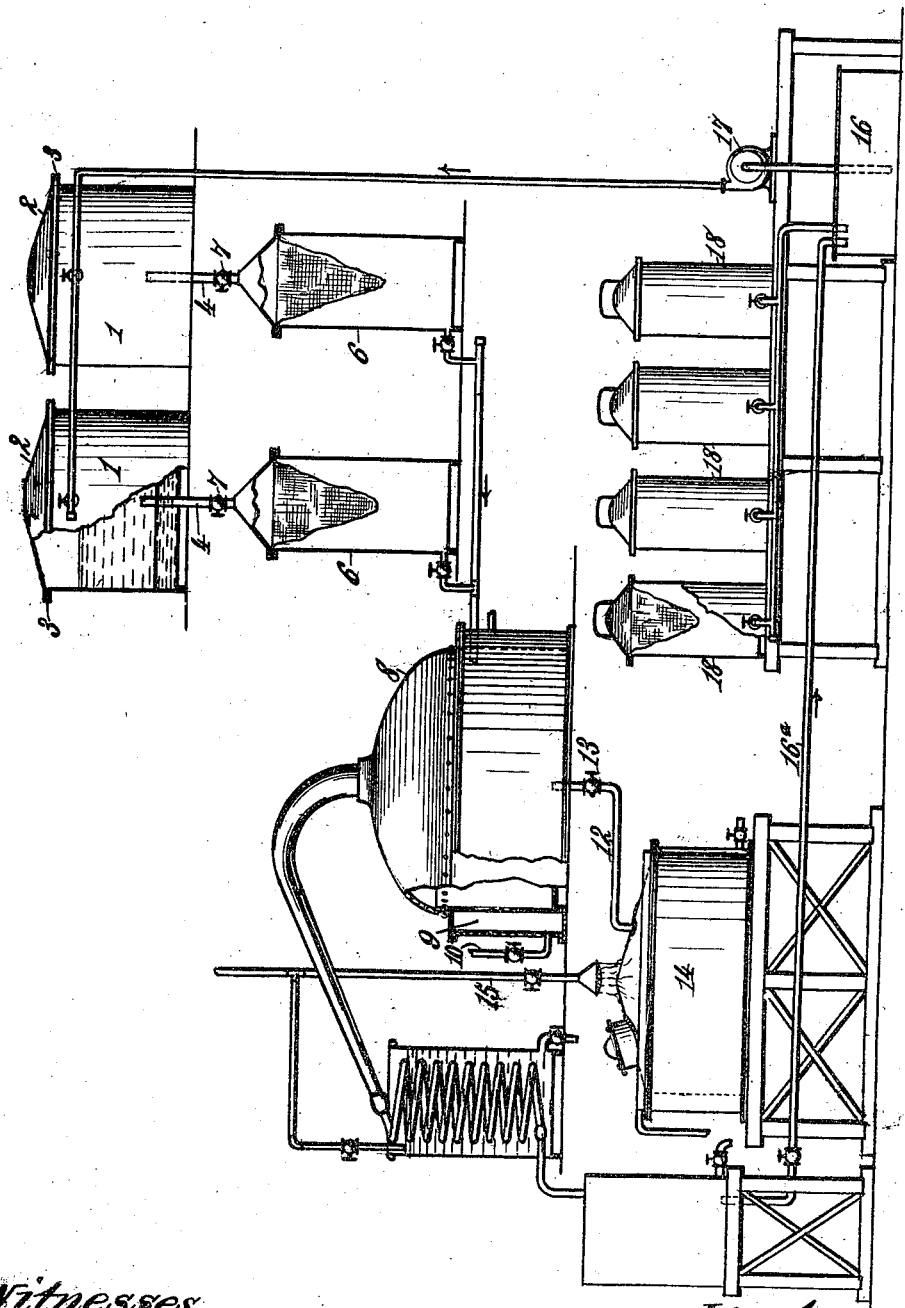
Witnesses:
Robert Everett
Geo. W. Rea
Inventor:
Joseph R. France.
By James L. Norris.
Atty.

UNITED STATES PATENT OFFICE.

JOSEPH R. FRANCE, OF NEW YORK, N. Y., ASSIGNOR TO THE ARLINGTON MANUFACTURING COMPANY, OF SAME PLACE.

PROCESS OF PURIFYING CAMPHOR.

SPECIFICATION forming part of Letters Patent No. 574,725, dated January 5, 1897.

Application filed August 2, 1895. Serial No. 558,003. (No specimens.)

*To all whom it may concern:*

Be it known that I, JOSEPH R. FRANCE, a citizen of the United States, residing at New York city, in the county of New York and State of New York, have invented new and useful Improvements in the Process of Purification of Crude Camphor and its Reduction to a Crystalline, Anhydrous, and Granular Condition, of which the following is a specification.

It is the purpose of my invention to provide a novel and economical process for the purification of crude camphor and its reduction to a crystalline, anhydrous, and granular condition.

My invention consists in the process of purifying and dehydrating crude camphor, as hereinafter set forth and claimed.

The substance commercially known as "crude camphor" and defined chemically by the formula $C_{10}H_{16}O$ is usually supplied to our markets from Formosa or Japan. Before it can be considered as serviceable in the arts it must be refined, this being usually accomplished by the process of sublimation, which is well understood. By this process the refined camphor is obtained in a solid cake or mass, which for many uses must be granulated. This process, besides adding to the expense, is subject to the further objection that it causes a loss of the volatile substances present and leaves the granulated camphor mechanically combined with a quantity of water, which for certain purposes renders the camphor wholly unfit for use. A method has also been practiced for the production of a granulated camphor, this product being commercially known as "flowers of camphor;" but this is subject to the same objection, as the granulated camphor retains a considerable part of the water present in crude camphor. Moreover, neither process referred to eliminates all the impurities found in the crude camphor, so that neither flowers of camphor nor camphor refined by sublimation is fit for use in any of the arts requiring pure camphor. In the manufacture of pyralin, xylonite, and all pyroxylin compounds, for example, it is essential that the camphor used as a solvent shall be entirely pure, anhydrous, and in a granular or pulverized state. It is my aim to produce a refined camphor which shall fully answer all these essential requirements and to provide a method or process of refining crude camphor whereby I can obtain a product consisting of perfectly pure anhydrous granular camphor crystals wholly unlike anything heretofore known, the cost of production being reduced and the process being carried on without loss of the volatile constituents of pure camphor, the presence of which is essential in the manufacture of pyroxylin compounds.

My invention consists in the process hereinafter described for purifying, dehydrating, and granulating camphor.

To enable those skilled in the art to which my invention pertains to fully understand and practice said invention, I will now proceed to describe the same in detail, reference being had for this purpose to the accompanying drawing, in which the figure is a sectional elevation showing one form of apparatus suitable for the practice of my invention.

In practicing my process I first place the crude camphor in a dissolving vessel, which is constructed of zinc or other suitable metal, care being taken to avoid unnecessary exposure to the air after the tub or can containing the crude camphor is opened. The dissolving vessel is provided with a tightly-closing cover, as the solvent which I prefer to use is naphtha having a specific gravity of 60° Baumé or thereabout. It is filtered before using to remove any solid particles of matter that may be present. The cover of the dissolving vessel being then fastened, it is allowed to stand until the solvent action has proceeded to the proper point. The vessel being undisturbed, the water of crystallization, or the moisture mechanically combined with the crude camphor, and which may amount to about fifteen per cent. of the same, will sink to the bottom of the vessel, owing to its greater specific gravity. For the same reason the extraneous or foreign matter present in the crude camphor will also pass to the bottom, leaving the naphtha, with pure camphor held in solution, floating upon the water. The supernatant solution of naphtha and pure camphor is then drawn off into a filtering vessel, the water being left in the dissolving vessel. The filtering vessel contains an ordinary bag-filter, preferably of muslin, though felt or other suitable material may be used. From the filtering vessel the pure camphor in naphtha solution is run into a still by which the naphtha is driven off, condensed, and recovered for further use. The process of distillation is carried on until the contents of the still are reduced to the consistency of a syrup, when they are removed to condensing-pans, where the crystallization of the pure anhydrous camphor begins immediately, the crystals being small, irregular, entirely transparent, slightly adherent when dry, and showing but slight affinity for moisture when exposed to the atmosphere. They possess the characteristic odor and pungent aromatic taste of camphor in a very marked degree.

The naphtha may be entirely driven off by the still, but should any remain after the distillation the crystallized camphor may be placed in bag-filters in closed chambers, where the naphtha will easily drain away, separating so perfectly that not the slightest odor remains.

It should be noted that in all the steps of this process heat is employed at one point only, the solution, filtering, and final crystallization being conducted at ordinary temperatures. The heat of the still is preferably supplied by steam, a jacket being provided for this purpose, the distilling temperature never rising sensibly above 212° Fahrenheit. For these reasons I avoid driving off the volatile constituents of the camphor, which are valuable for manufacturing purposes. Moreover, the still being hermetically closed, no escape of such volatilized constituents is possible.

I have shown in the accompanying drawing one form of apparatus suitable for the practice of my invention, the reference-numeral 1 indicating one or more dissolving vessels, each having a cover 2, provided with suitable packing 3. A draw-off pipe 4 enters the bottom of each vessel and rises above its bottom far enough to pass through the stratum of water which will be formed by the dissolution of the crude camphor, thereby enabling the naphtha holding the pure camphor in solution to be withdrawn and separated from the water which was combined with the crude camphor and which settles to the bottom of the dissolving vessel. A filtering vessel 6 is preferably arranged below each dissolving vessel, so that the solution may be run into the filter without any exposure to the air. A cock or valve 7 is placed in the draw-off tube.

The numeral 8 denotes the still, which has a surrounding jacket 9 and steam-pipe 10. From the bottom of the still a pipe 12, having a cock or valve 13, leads to the cooling or crystallizing pan 14, which is arranged with a water-jacket surrounding it. A jet of water supplied by a pipe 15 cools the top of the pan 14, in which condensation and crystallization take place. The recovered condensed solvent from the still and from the draining-cans is collected in a reservoir 16 and carried by a rotary pump 17 back to the dissolving vessel or vessels, where it is again used in the same manner.

The numeral 18 indicates one or more draining vessels, which are adapted to receive the crystallized camphor in draining-bags to allow the solvent to pass entirely off. The reservoir 16 is connected by a pipe 16$^A$ to the condensing vessel which receives the solvent driven off by the still.

While I prefer to use naphtha as a solvent, I do not limit my invention to its use. I prefer it because of its low cost, light specific gravity, and extremely volatile character; but I may use other well-known hydrocarbons as solvents which possess similar qualities in a sufficient degree for my purpose.

The apparatus described may be varied considerably and forms no essential part of my present invention.

The product obtained by my process as herein described differs in a marked degree from refined camphor produced by other known processes. For example, camphor produced by what is known as the "Hirsch process" is a finely-divided perfectly opaque snow-white substance, having no suggestion of a crystalline formation, but resembling finely-pulverized chalk, cohering in small bodies. Its entire want of transparency or even translucency, its brilliant white color, and the entire absence of a crystalline appearance are the most prominent characteristics of this camphor. Camphor has also been refined by the "Sims process," the product being white without transparency and bearing a close resemblance to powdered or pulverized sugar.

The camphor refined by my process is distinctly crystalline and has perfect transparency, while at the same time it is produced in a granular condition, the granules being composed of the separate crystals or of two or three adhering together. The crystals are substantially orthorhombic in formation, and in form, color, transparency, crystalline form, and the granular state in which it is produced and which it retains indefinitely it differs so widely from camphor produced by other processes that it would be taken for a different substance were it not for its characteristic odor.

What I claim is—

1. The process described for the purification of crude camphor and its reduction to anhydrous, granular camphor crystals, said process consisting in dissolving crude camphor in a closed chamber in a solvent having a less specific gravity than water, withdrawing the solvent with the pure camphor in solution from off the stratum of water on which it floats in the dissolving-chamber, driving off the solvent and crystallizing the pure, anhydrous camphor held in solution by it, substantially as described.

2. The process described for the purification of crude camphor and its reduction to anhydrous, granular camphor crystals, said process consisting in dissolving crude camphor in a closed chamber in a hydrocarbon, such as naphtha, having a less specific gravity than water, separating the solution of pure camphor by allowing it to float upon the stratum of water set free from the crude camphor by solution, withdrawing the supernatant solution to a closed filtering-chamber, and filtering the same, then separating the hydrocarbon solvent by distillation, and crystallizing the pure, anhydrous camphor remaining, substantially as described.

3. The process described for purifying crude camphor and reducing it to anhydrous, granular, camphor crystals, said process consisting in dissolving the pure from the crude camphor by a solvent of less specific gravity than water, separating the water set free by the crude camphor from the supernatant solution of pure camphor, driving off the solvent by distillation, and filtering the remaining concentrated solution to separate the remainder of the solvent from the granular mass of crystals of pure anhydrous camphor, substantially as described.

4. The process described for purifying crude camphor and reducing it to anhydrous, granular, camphor crystals, which consists in dissolving crude camphor in a hydrocarbon such as naphtha or other solvent having less specific gravity than water, separating the water yielded by the crude camphor from the supernatant solution of pure camphor by drawing off the latter, filtering said separated solution, driving off the solvent by distillation, crystallizing the pure anhydrous granular camphor, and separating any remaining solvent therefrom by filtering, substantially as described.

In testimony whereof I have hereunto set my hand in presence of two subscribing witnesses.

JOSEPH R. FRANCE.

Witnesses:
W. L. HEBBERD,
R. J. SICKELS.